(12) United States Patent
Yang (10) Patent No.: US 8,123,507 B2
(45) Date of Patent: Feb. 28, 2012

(54) COTTON CANDY MACHINE (76) Inventor: Yi-Chiang Yang, Changhwa (TW)

( * ) Notice: Subject to any disclaimer, the term of this patent is extended or adjusted under 35 U.S.C. 154(b) by 355 days.

(21) Appl. No.: 12/589,981

(22) Filed: Oct. 29, 2009

(65) Prior Publication Data

US 2011/0104316 A1 May 5, 2011

(51) Int. Cl.
B29C 67/02 (2006.01)
A23G 7/00 (2006.01)

(52) U.S. Cl. ......... 425/9; 425/125; 425/126.2; 425/150; 425/332; 425/425; 426/91; 426/512; 426/517; 426/660

(58) Field of Classification Search ................. 425/8, 9, 425/125, 126.1, 126.2, 150, 222, 332, 425, 425/436 R; 426/91, 283, 103, 104, 512, 426/517, 660; 264/8
See application file for complete search history.

(56) References Cited

U.S. PATENT DOCUMENTS

| | | | | |
|---|---|---|---|---|
| 3,203,365 A * | 8/1965 | Bowe et al. | ......................... | 425/9 |
| 3,856,443 A * | 12/1974 | Salvi | ................................. | 425/9 |
| 3,930,043 A * | 12/1975 | Warning et al. | ............... | 426/515 |
| 4,293,292 A * | 10/1981 | Israel | ................................. | 425/9 |
| 4,360,328 A * | 11/1982 | Kassabian | .......................... | 425/9 |
| 5,346,377 A * | 9/1994 | Bogue et al. | ...................... | 425/9 |
| 5,511,961 A * | 4/1996 | Sullivan | ............................. | 425/9 |
| 5,876,764 A * | 3/1999 | Buttin et al. | ....................... | 425/9 |
| 6,612,823 B2 * | 9/2003 | Bandou et al. | ..................... | 425/9 |
| 2001/0041195 A1 * | 11/2001 | Bandou et al. | ..................... | 425/9 |
| 2002/0192319 A1 * | 12/2002 | Todokoro | ........................... | 425/9 |
| 2009/0074931 A1 * | 3/2009 | Hawthorne | ................... | 426/517 |

* cited by examiner

Primary Examiner — Joseph Del Sole
Assistant Examiner — Seyed Masoud Malekzadeh
(74) Attorney, Agent, or Firm — Charles E. Baxley (57) ABSTRACT A cotton candy machine includes a housing and a stick grabbing device mounted in the housing. A stick rotating device is mounted in the housing and aside corresponds to the stick grabbing device. A feeding device is mounted in the housing and a sugar floss maker is horizontally mounted in the housing under the stick rotating device. The stick grabbing device provides stick one by one and conveys the stick to the stick rotating device. The stick rotating temporarily holds the stick, rotates the stick and makes the stick longitudinally insert into the sugar floss maker for coiling the sugar floss from the sugar floss maker after the feeding device providing sugar material into the sugar floss maker.

11 Claims, 14 Drawing Sheets

COTTON CANDY MACHINE

BACKGROUND OF THE INVENTION

1. Field of the Invention

The present invention relates to a cotton candy machine, and more particularly to a full-automatic cotton candy machine.

2. Description of Related Art

A cotton candy is a popular snack for a long time. However, most of the conventional cotton candy machines are semi-automatic. Consequently, the seller/operator needs to put sugar granules into a rotating spinner head of the conventional cotton candy machine, then the rotating head forms sugar floss after the sugar granules being melted due to a centrifugal force of the rotating spinner head. At the same time, the seller/operator uses a stick to coil sugar floss and finish a cotton candy. As described above, the conventional cotton candy machine needs an operator to feed sugar granules and coil the sugar floss such that the cost of selling cotton candy is high and the profit of selling cotton candy is reduced.

The present invention has arisen to mitigate and/or obviate the disadvantages of the conventional semi-automatic cotton candy machine.

SUMMARY OF THE INVENTION

The main objective of the present invention is to provide an improved cotton candy machine that is full-automatic and used as a slot machine.

To achieve the objective, the cotton candy machine in accordance with the present invention comprises a housing having a platform horizontally mounted in a middle portion thereof and a lower seat secured on a bottom of the housing. A window is defined in a panel of the housing and a shelter is pivotally mounted to an edge of the window for selectively closing the window. The shelter is made of transparent material for user to conveniently take the finished cotton candy through the window. A plate is secured on the lower seat. A stick grabbing device is mounted on the platform in the housing. The stick grabbing device includes a receiving unit secured on the platform for containing sticks. An outputting device is transversely mounted to a front portion of the receiving unit for taking the sticks away from the receiving unit one by one. A drive device is laterally mounted to the receiving unit for driving the outputting device. A push device is mounted on the platform and aside corresponds to the outputting device for horizontally and longitudinally pushing the stick that is outputted from the outputting device. A stick rotating device is mounted on the platform for downward moving and rotating the stick, and includes an elevator vertically mounted on the platform and reciprocally moved relative to the platform. A control device is mounted on the elevator. A holding device is connected to the control device for temporarily holding the stick from the stick grabbing device and rotating the stick when the stick is vertical relative to the platform. A sugar floss maker is mounted on the lower seat and eccentrically corresponds to the stick rotating device. The sugar floss maker includes a motor longitudinally mounted on the lower seat and a bowl co-axially mounted on the top of the motor of the sugar floss maker. A spinner head is centrally mounted on a bottom of the bowl and driven by the motor of the sugar floss maker. A feeding device is mounted on the platform and includes a tube connected thereto. The tube has a free end extending into the bowl and co-axially corresponding to the spinner head for feeding sugar granules into the spinner head in a changeless quantity such that the spinner head forms sugar floss when the motor of the sugar floss maker is operated.

Further benefits and advantages of the present invention will become apparent after a careful reading of the detailed description with appropriate reference to the accompanying drawings.

DETAILED DESCRIPTION OF THE INVENTION

Figure 1:
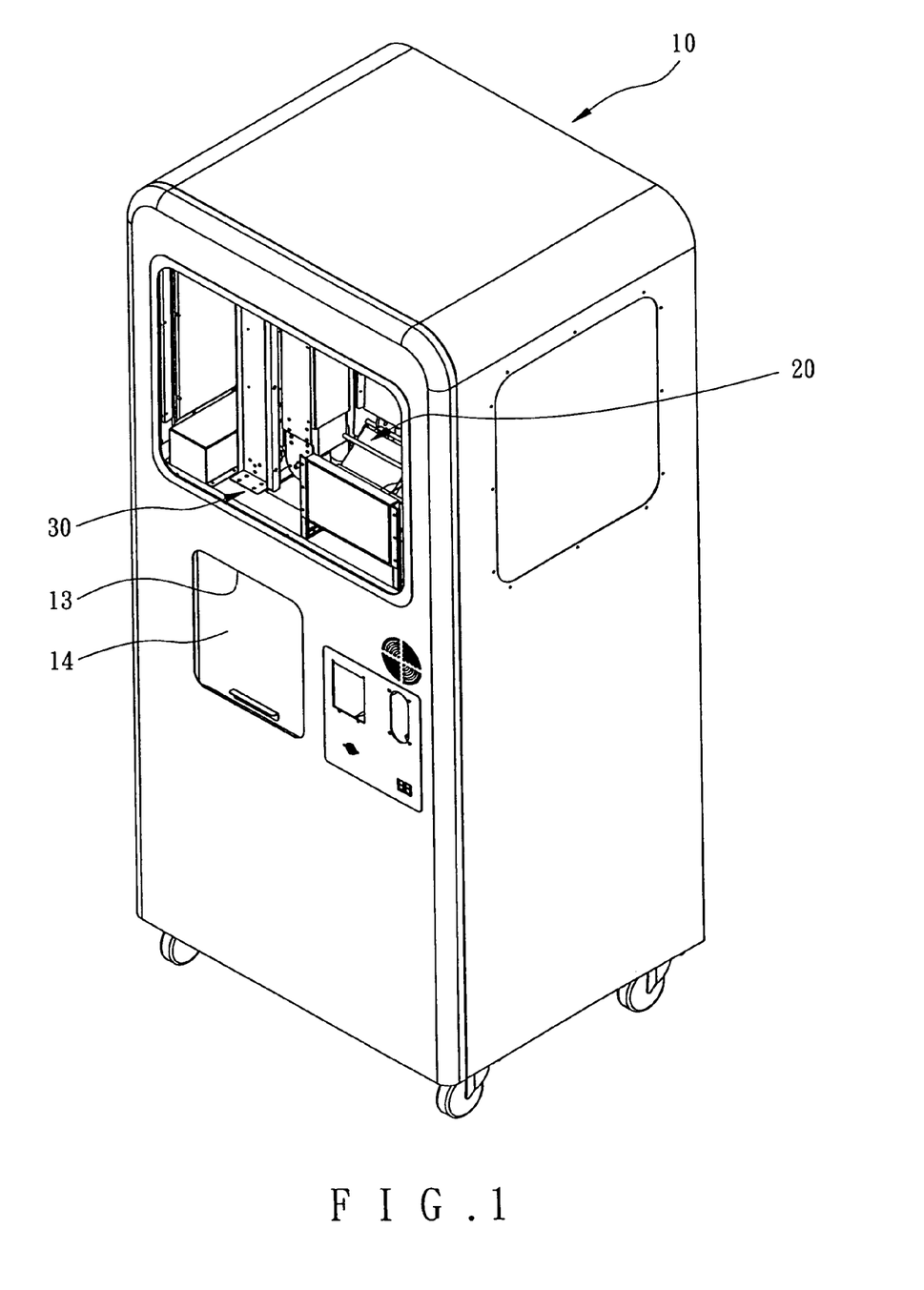
FIG. 1 is a perspective view of a cotton candy machine in accordance with the present invention.
Figure 2:
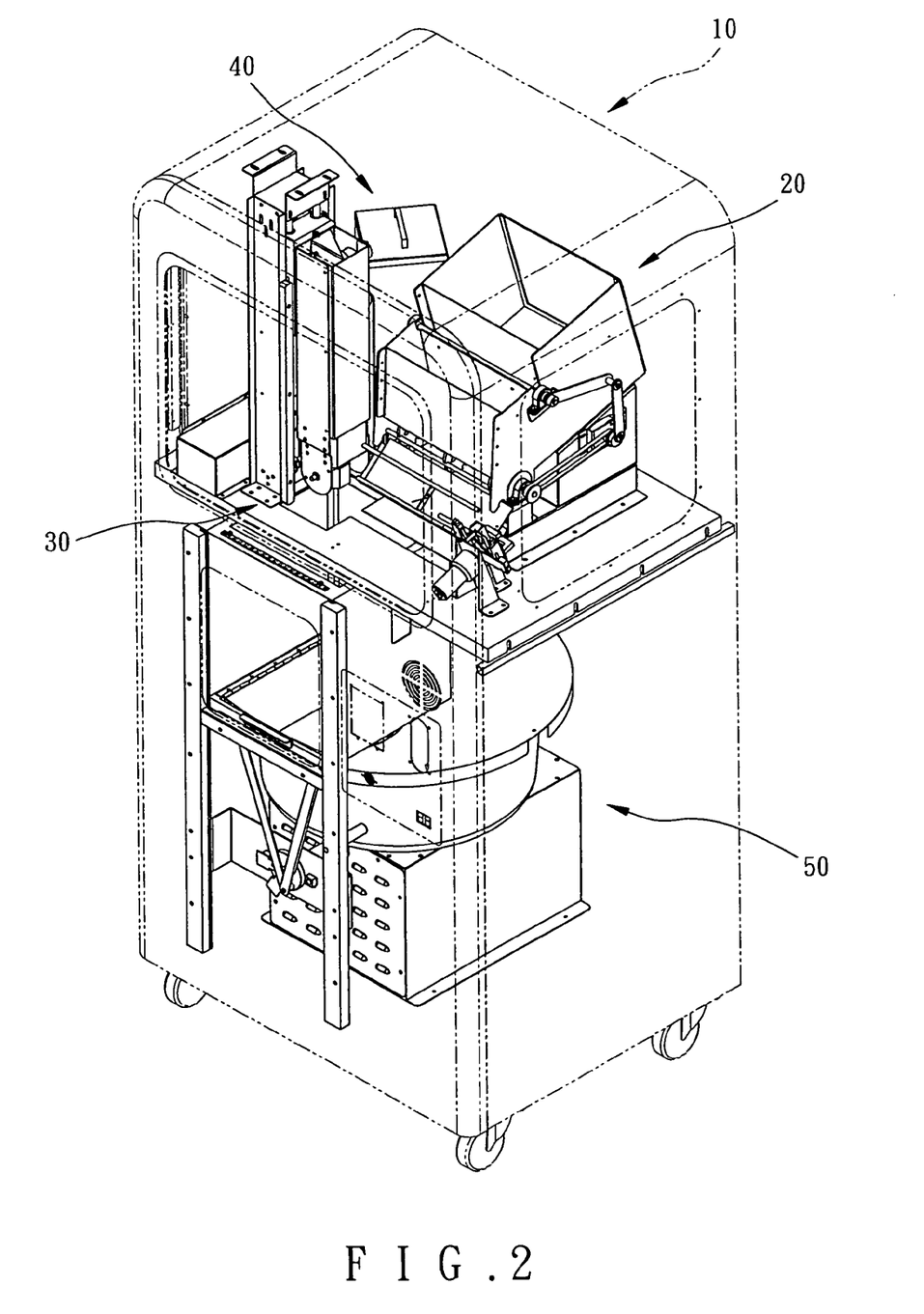
FIG. 2 is a perspective view of the cotton candy machine of the invention in fluoroscopy.
Figure 3:
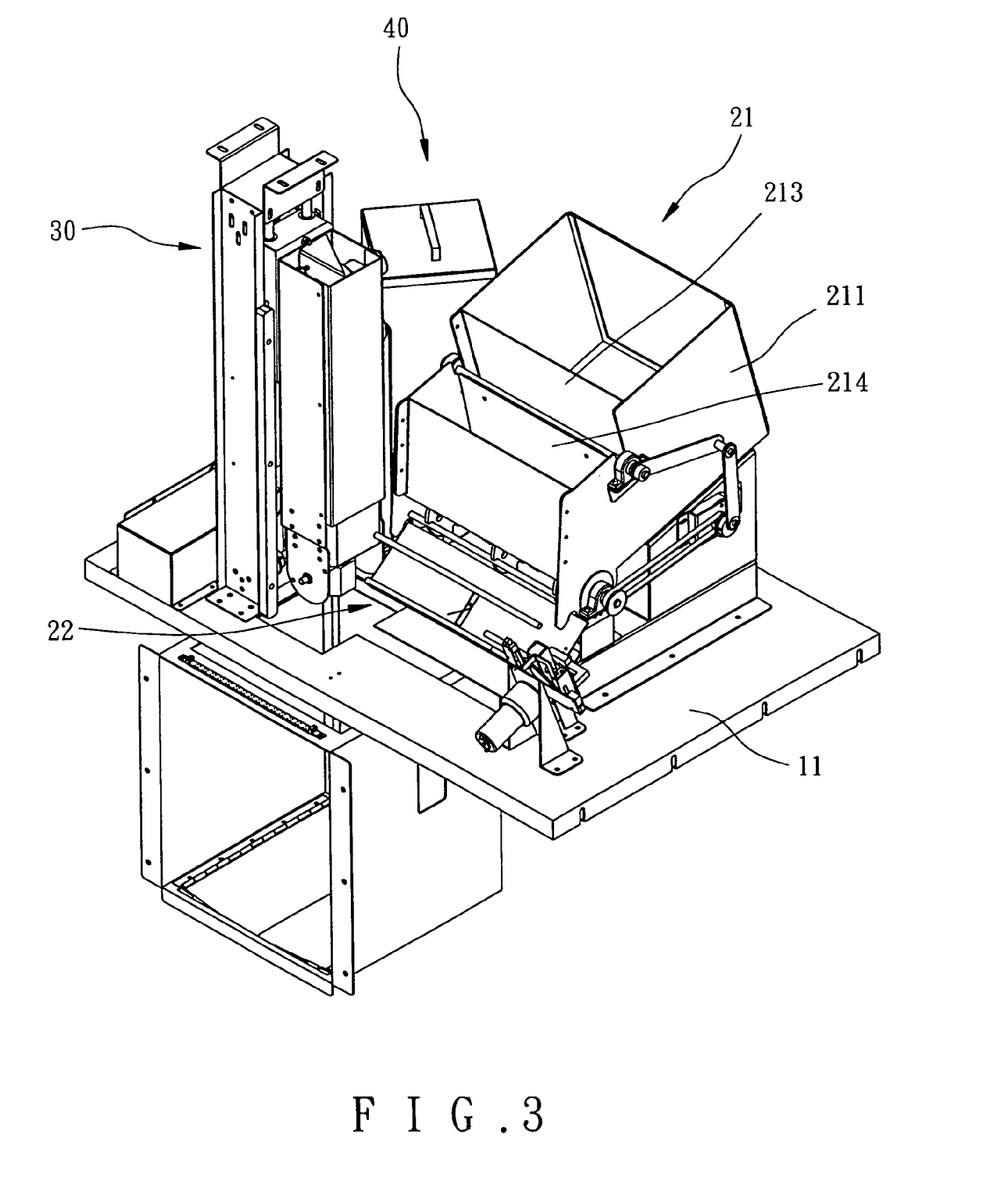
FIG. 3 is a partially perspective view of the cotton candy in accordance with the present invention.
Figure 4:
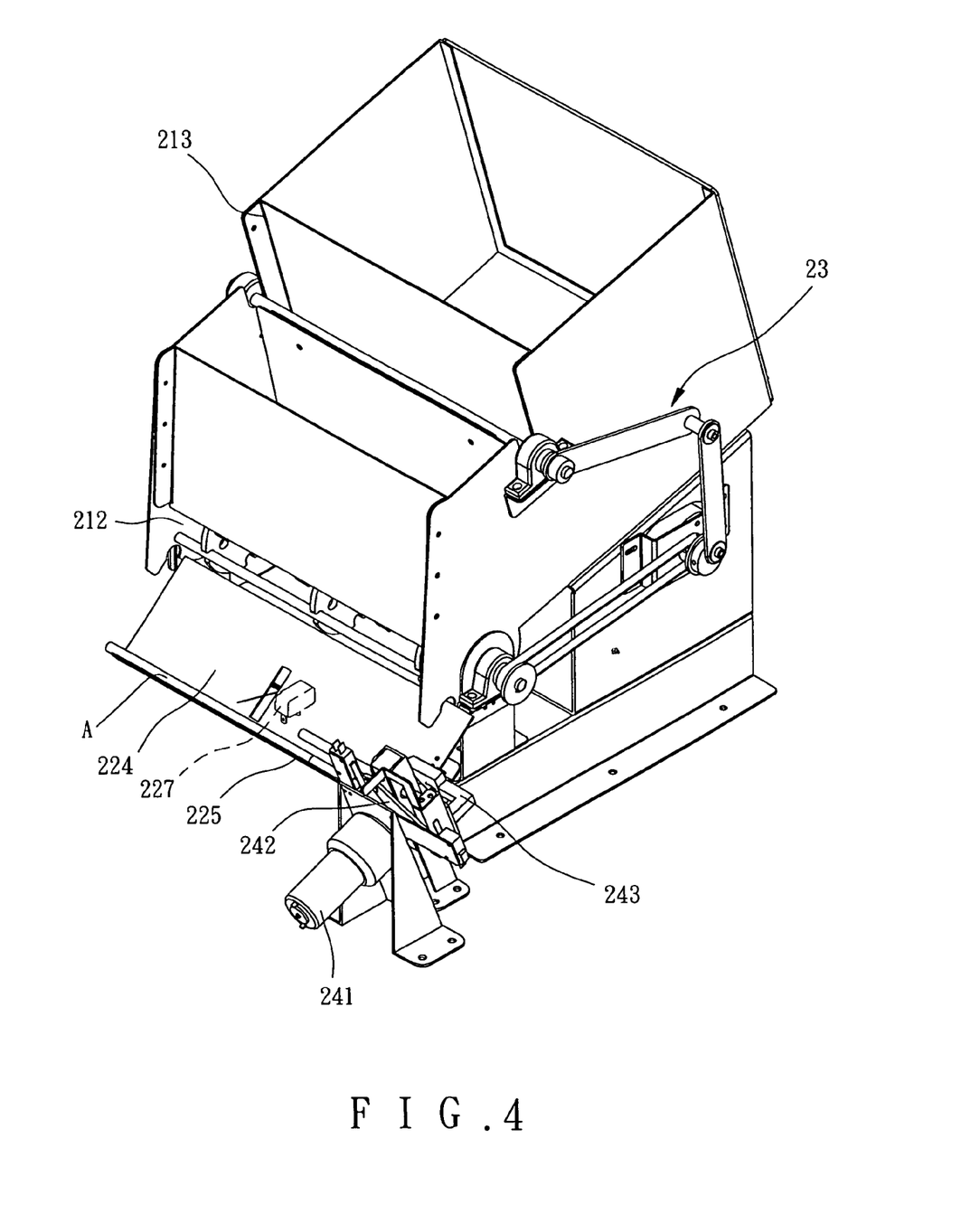
FIG. 4 is a is perspective view of a stick grabbing device of the cotton candy machine in accordance with the present invention.
Figure 5:
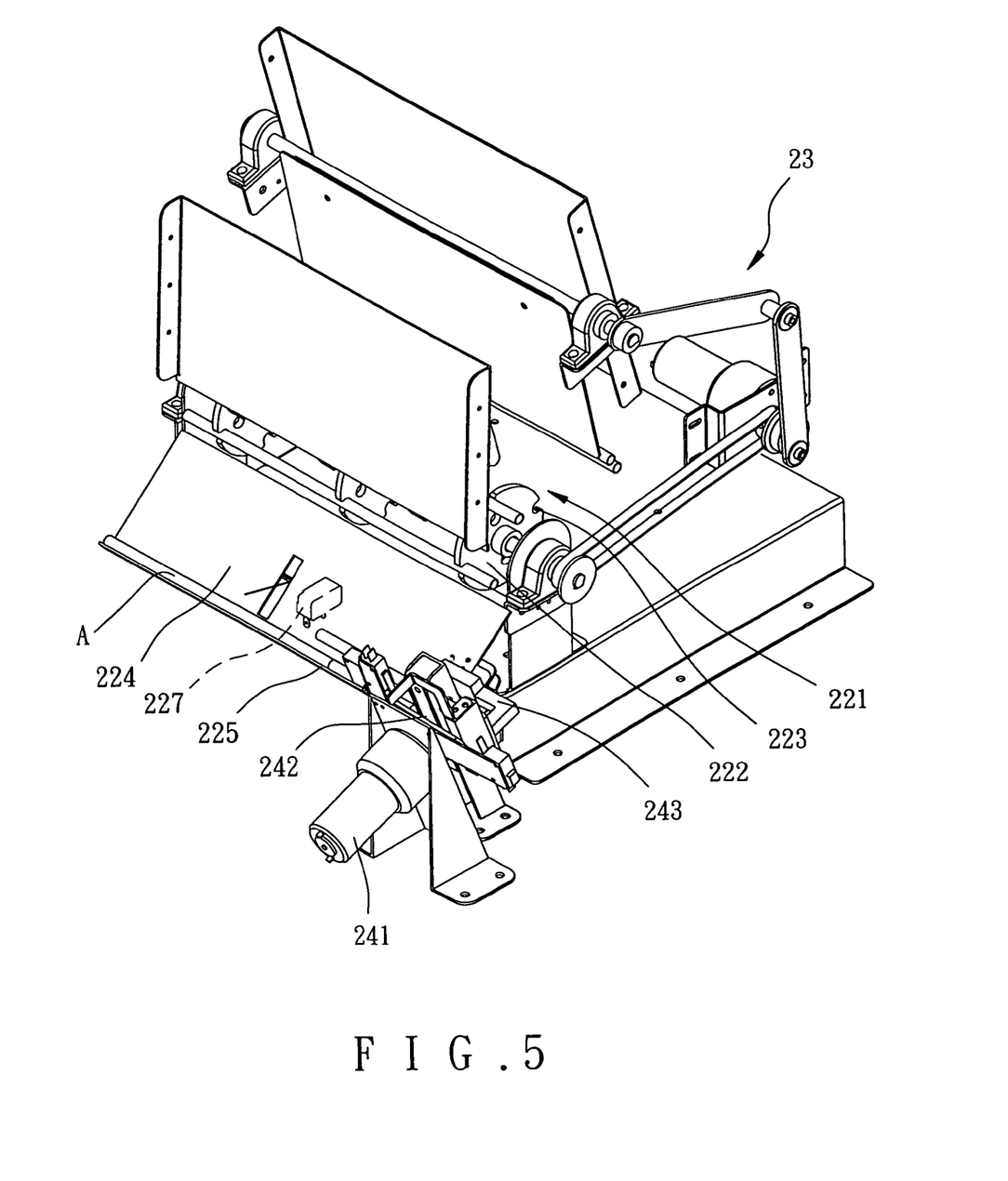
FIG. 5 is a partially perspective view of a stick grabbing device of the cotton candy machine in accordance with the present invention.
Figure 6:
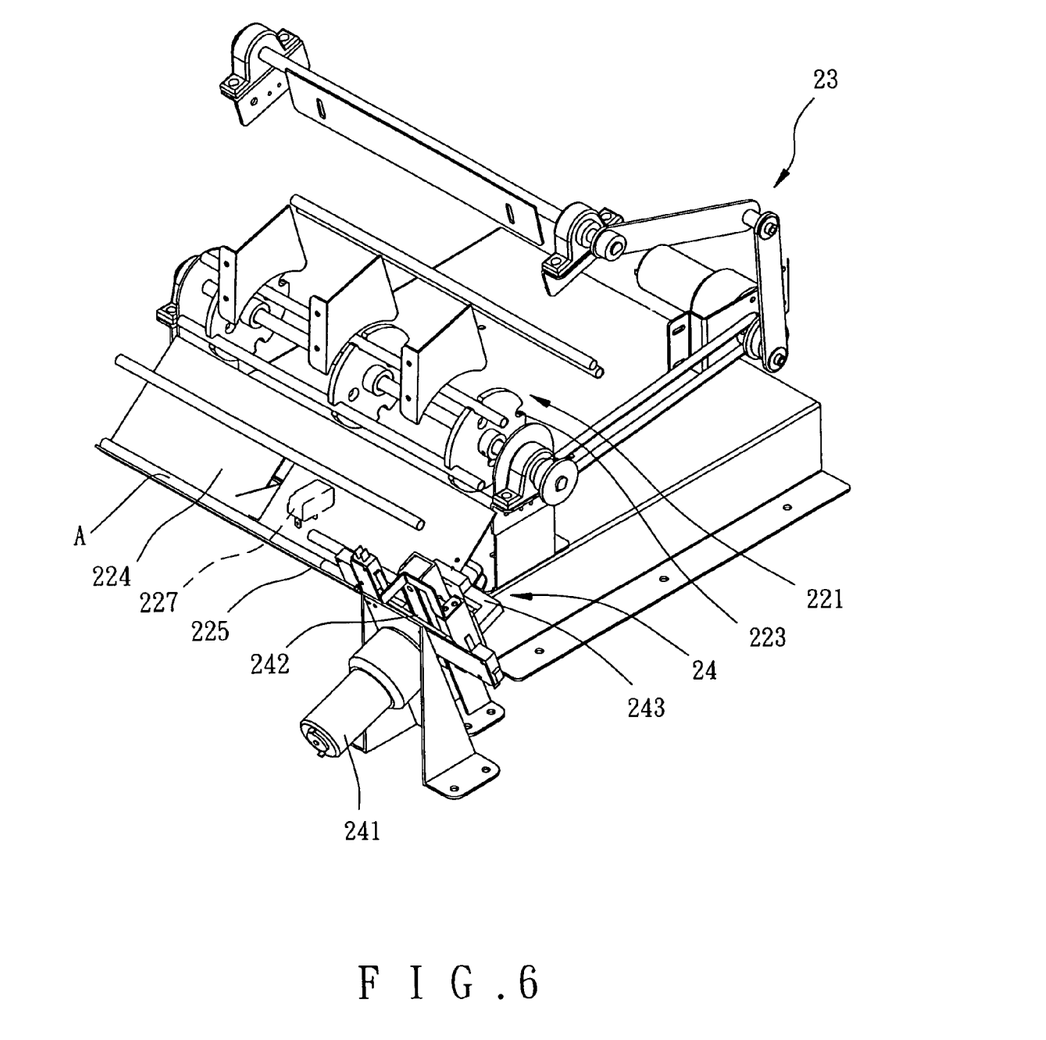
FIG. 6 is a partially perspective view of the stick grabbing device of the cotton candy machine in accordance with the present invention.

Referring to the drawings and initially to FIGS. 1-2, a cotton candy machine in accordance with the present invention comprises a housing (10) and a stick grabbing device (20) mounted in the housing (10). A stick rotating device (30) is mounted in the housing (10) and aside corresponds to the stick grabbing device (20). A feeding device (40) is mounted in the housing (10) and a sugar floss maker (50) is horizontally mounted in the housing (10) under the stick rotating device (30). The stick grabbing device (20) provides stick (A) one by one and conveys the stick (A) to the stick rotating device (30). The stick rotating device (30) temporarily holds the stick (A), rotates the stick (A) and makes the stick (A) longitudinally insert into the sugar floss maker (50) for coiling the sugar floss from the sugar floss maker (50) after the feeding device (40) providing sugar material into the sugar floss maker (50).

The housing (10) has a platform (11) horizontally mounted in a middle portion thereof and a lower seat (12) secured on a bottom of the housing (10). A window (13) is defined in a panel of the housing (10) and a shelter (14) is pivotally mounted to an edge of the window (13) for selectively closing the window (13). The stick grabbing device (20), the stick rotating device (30) and the feeding device (40) are respectively mounted on the platform (11), and the sugar floss maker (50) is mounted on the lower seat (12). The shelter (14) is made of transparent material for user to conveniently take the finished cotton candy through the window (13). The housing (10) further comprises a plate (15) secured on the lower seat (12).

With reference to FIGS. 2 to 6, the stick grabbing device (20) includes a receiving unit (21) secured on the platform (11) of the housing (10) for containing sticks (A). The receiving unit (21) includes a casing (211) having an upper opening and a bottom that is slant relative to the panel of the housing (10) and has a transverse opening (212) defined in a front portion of the bottom of the casing (211). A partition (213) is transversely secured in a middle portion of the casing (211). The partition (213) has a lower edge that is separated from the bottom of the casing (211) and the distance between the lower edge of the partition (213) and the bottom of the casing (211) is provided to decide the number of the layers of the piled sticks (A) after passing the partition (213). A stir plate (214) is downward pivotally in the casing (211) and front relative to the partition (213). The stir plate (214) makes the sticks (A) moved toward a front portion of the casing (211) one after one.

An outputting device (22) is transversely mounted to a front portion of the receiving unit (21) for taking the stick (A) away from the receiving unit (21). The outputting device (22) includes a roller set (221) pivotally and transversely mounted to the front portion of the casing (211). The roller set (221) is parallel to the transverse opening (212). The roller set (221) includes multiple rollers (222) mounted thereon. Each roller (222) has multiple indentations (223) radially defined in a periphery thereof and equally dividing the periphery of each of the rollers (222) into several sections. The connecting line of corresponding indentations (223) of each of the rollers (222) is parallel to an axis of the roller set (221). A slide plate (224) is pivotally mounted on the platform (11) by supports (not shown). The slide plate (224) includes a rear edge inserted into the transverse opening (212) and corresponding to the roller set (221), and a front edge having a stopper (225) upwardly extending therefrom to prevent the stick (A) from detaching from the slide plate (224). A through hole (226) is defined in the slide plate (224). A sensor (227) is secured on a back of the slide plate (224) and corresponds to the through hole (226) for sensing the rolling stick (A) that passes through the through hole (226).

A drive device (23) is laterally mounted to the casing (211) for driving the stir plate (214) and the roller set (221) such that the stir plate (214) is reciprocally wiggled relative to the partition (213) and the roller set (221) is rotated from casing (211) to the slide plate (224) for grabbing the stick (A) to the slide plate (224). The rotating angle of the roller set (221) of each operation is equal to an included angle of two radiuses of two adjacent indentations (223).

A push device (24) is mounted on the platform (11) and aside corresponds to the outputting device (22). The push device (24) has a motor (241) mounted on the platform (11), a linkage set (242) connected to the motor (241) and a push set (243) connected to the linkage set (243), wherein the push set (243) is reciprocally moved relative to the slide plate (224). The push set (243) is driven by the motor (241) and horizontally pushes the stick (A), which is situated on the stopper (225). The slide plate (224) is downward wiggled by the push set (243) and the stick (A) is separated from the slide plate (224) when the stick (A) is pushed to and held by the stick rotating device (30).

Figure 7:
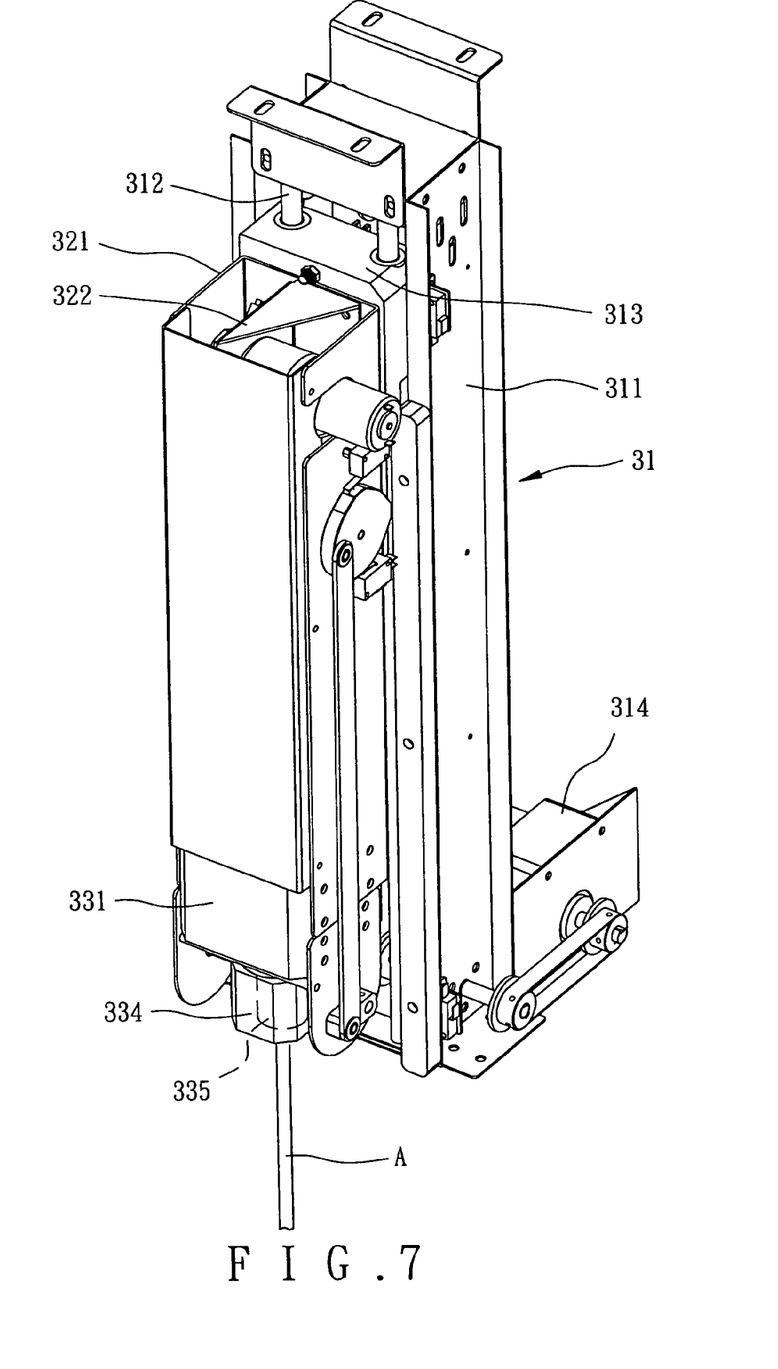
FIG. 7 is a perspective view of a stick rotating device of the cotton candy in accordance with the present invention.
Figure 8:
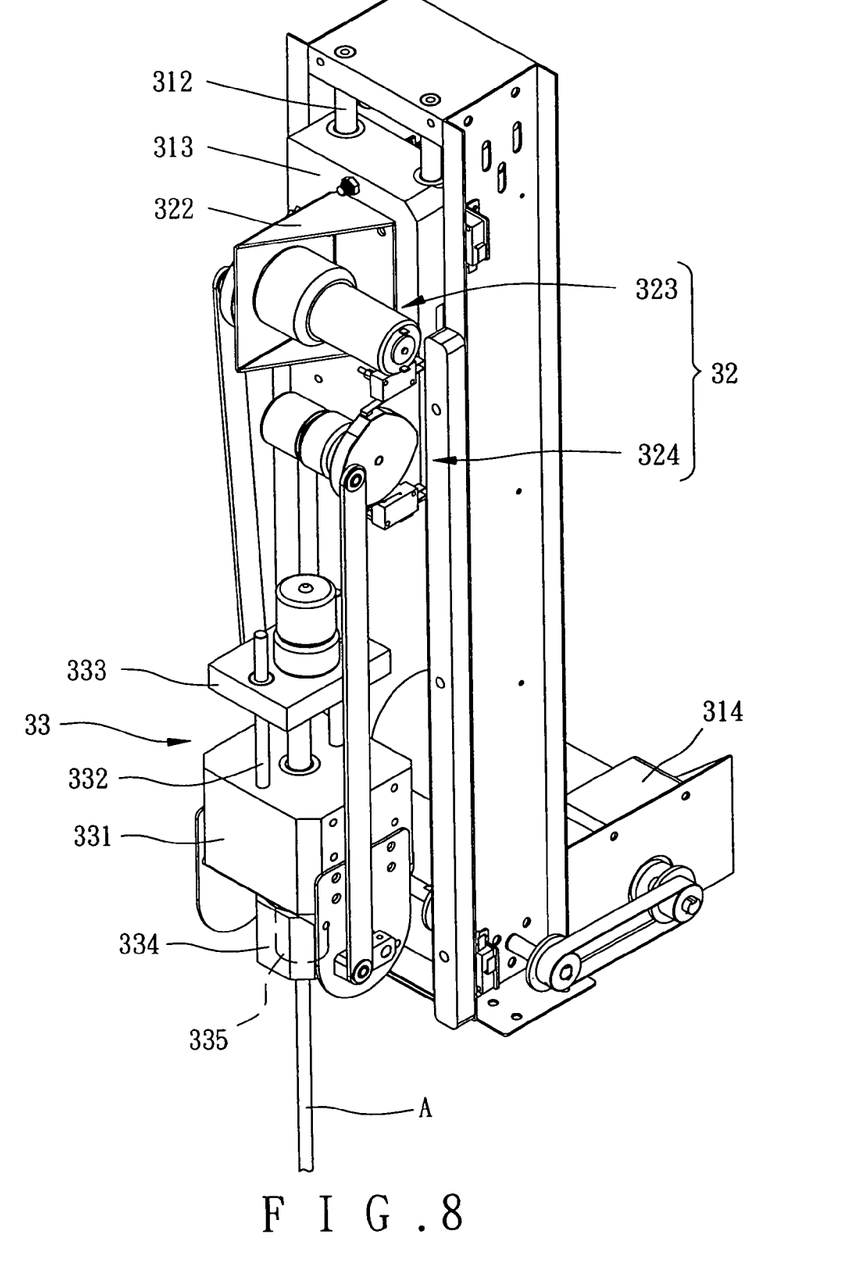
FIG. 8 is a partially perspective view of the stick rotating device of the cotton candy machine in accordance with the present invention.
Figure 9:
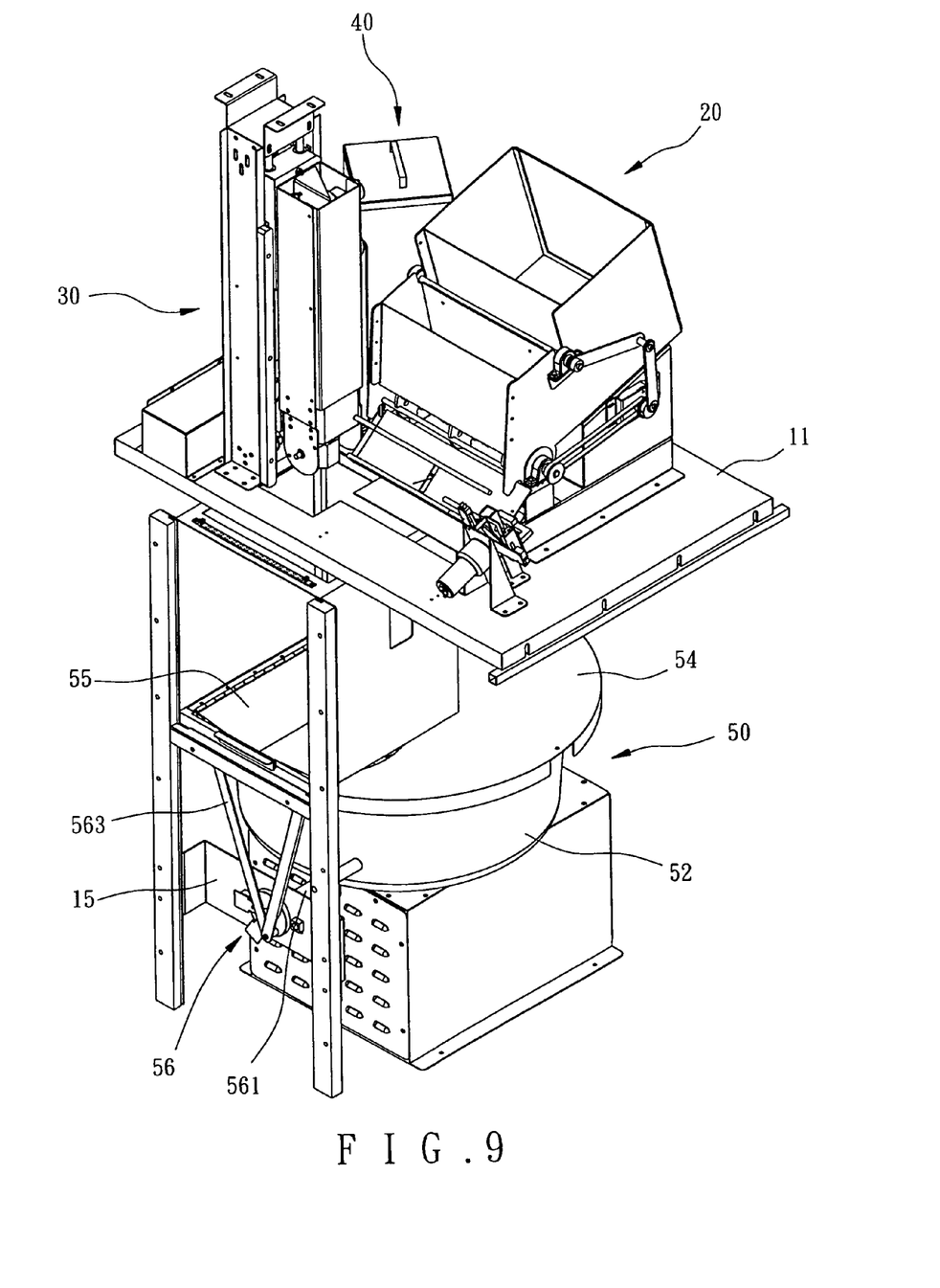
FIG. 9 us a partially perspective view of the cotton candy machine in accordance with the present invention.

With reference to FIGS. 2 and 7 to 8, the stick rotating device (30) includes an elevator (31) vertically mounted on the platform (11). The elevator (31) includes a casing (311) mounted on the platform (11). Two parallel pillars (312) are received in the casing (311) and vertically mounted on the platform (11), and a slider (313) is slidably mounted onto the two pillars (312). The slider (313) is situated on an upper portion of the two pillars (312) when the stick rotating device (30) have been operated. The elevator (31) has a motor (314) mounted thereon for operating the slider (313).

The stick rotating device (30) includes a control device (32) mounted on the elevator (31). The control device (32) has a frame (321) and a connector (322) respectively secured on the slider (313) of the elevator (31). The control device (32) includes a first control unit (323) and a second control unit (324) respectively mounted on the connector (322) and the frame (321).

The stick rotating device (30) includes a holding device (33) connected to the control device (32). The holding device (33) includes a stable seat (331) and two guide pillars (332) vertically extending from a top of the stable seat (331). A slider plate (333) is slidably mounted on the two guide pillars (332) and connected to the first control unit (323) such that slider plate (333) is reciprocally moved relative to the stable seat (331) when the first control unit (323) is operated. A wiggler (334) is pivotally mounted on the frame (321) and connected to the second control unit (324) such that the wiggler (334) is wiggled when the second control unit (324) is operated. Each wiggle range of the wiggler (334) is 90 degrees and the wiggler (334) is horizontal after being operated. A holder (335) is rotatably received in the wiggler (334) for temporarily holding the stick (A) and driven to rotate the stick (A) when the stick (A) is vertically inserted into the sugar floss maker (50).

With reference to FIGS. 9 to 14, the sugar floss maker (50) is mounted on the lower seat (12) in the housing (10) and eccentrically corresponding to the stick rotating device (30). The sugar floss maker (50) includes a motor (51) longitudinally mounted on the lower seat (12) and a bowl (52) co-axially mounted on the top of the motor (51). A spinner head (53) is centrally mounted on a bottom of the bowl (52) and driven by the motor (51). A cover (54) is mounted on the top of the bowl (52) for closing the bowl (52) and preventing the dust from entering the bowl (52). A through hole (541) is centrally defined in the cover (54). An opening (542) is eccentrically defined in the cover (54) and vertically linearly corresponds to the stick rotating device (30) for allowing a rotating stick (A) inserted into the bowl (52) due to elevator (31) of the stick rotating device (30). The sugar floss maker (50) further comprises a pair of wiggle plates (55) pivotally mounted on the casing for selectively closing the opening (542) in the cover (54). A drive device (56) is mounted on the plate (15) for controlling the pair of wiggle plates (542). The pair of wiggle plates (542) is lifted to open the opening (542) before the rotating stick (A) entering the bowl (52).

The drive device (56) includes a motor (561) laterally mounted to the plate (15) and a roller (562) co-axially mounted to a shaft (not shown) of the motor (561) after the shaft extending through the plate (15). Two linkages (563) are pivotally and eccentrically connected to a distal side of the roller (562) and a free end of each of the two linkages (563) is pivotally connected to a corresponding one of the pair of wiggle plates (55) for controlling the pair of wiggle plates (55) to allow the rotating stick (A) inserted into the bowl (52) and coil sugar floss from the spinner head (53) when the motor (561) of the drive device (56) is operated. Two tongues (564) are respectively radially secured on the roller (562) of the drive device (56) and two sensors (565) are respectively secured on the plate (15). The two tongues (564) respectively and selectively cover a corresponding one of the two sensors (565) for controlling the turn range of the roller (562) of the drive device (56).

Figure 10:
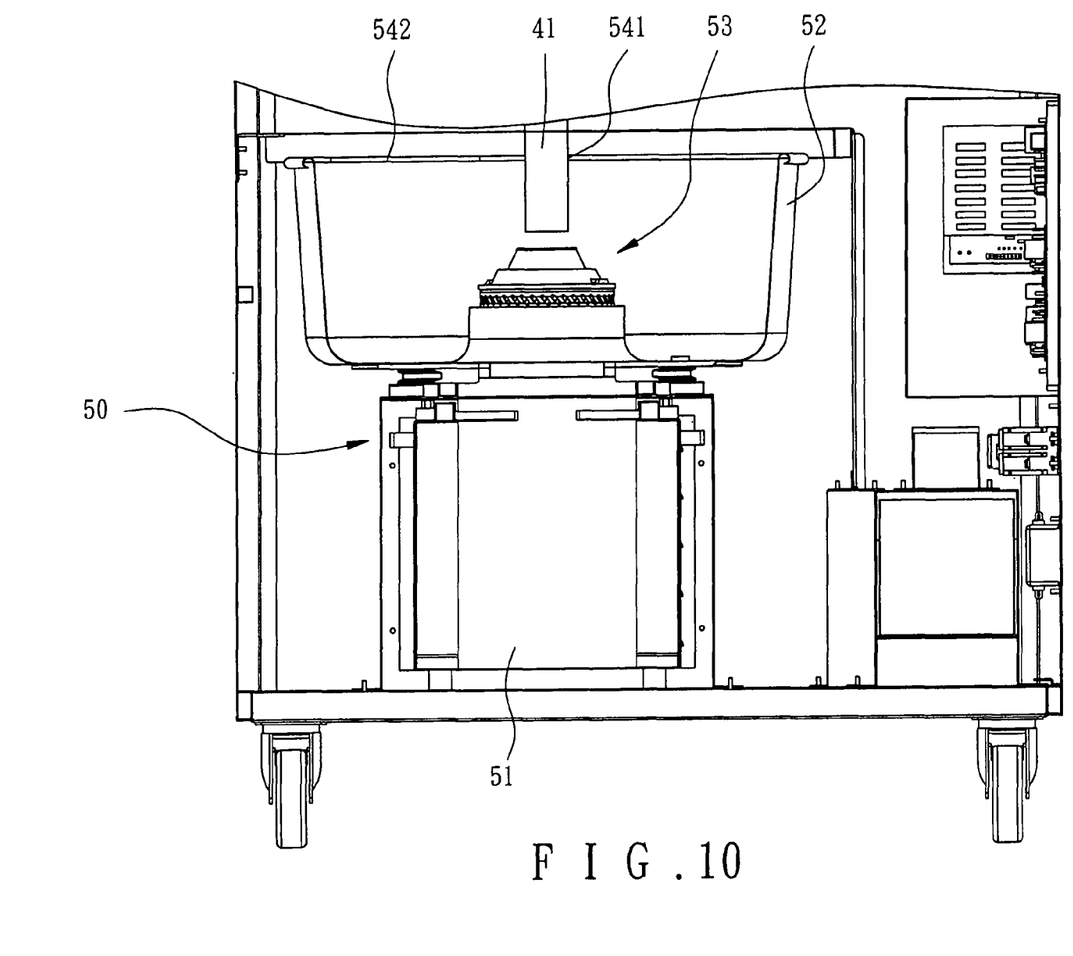
FIG. 10 is a side plan view of a sugar floss maker of the cotton candy machine in accordance with the present invention.
Figure 11:
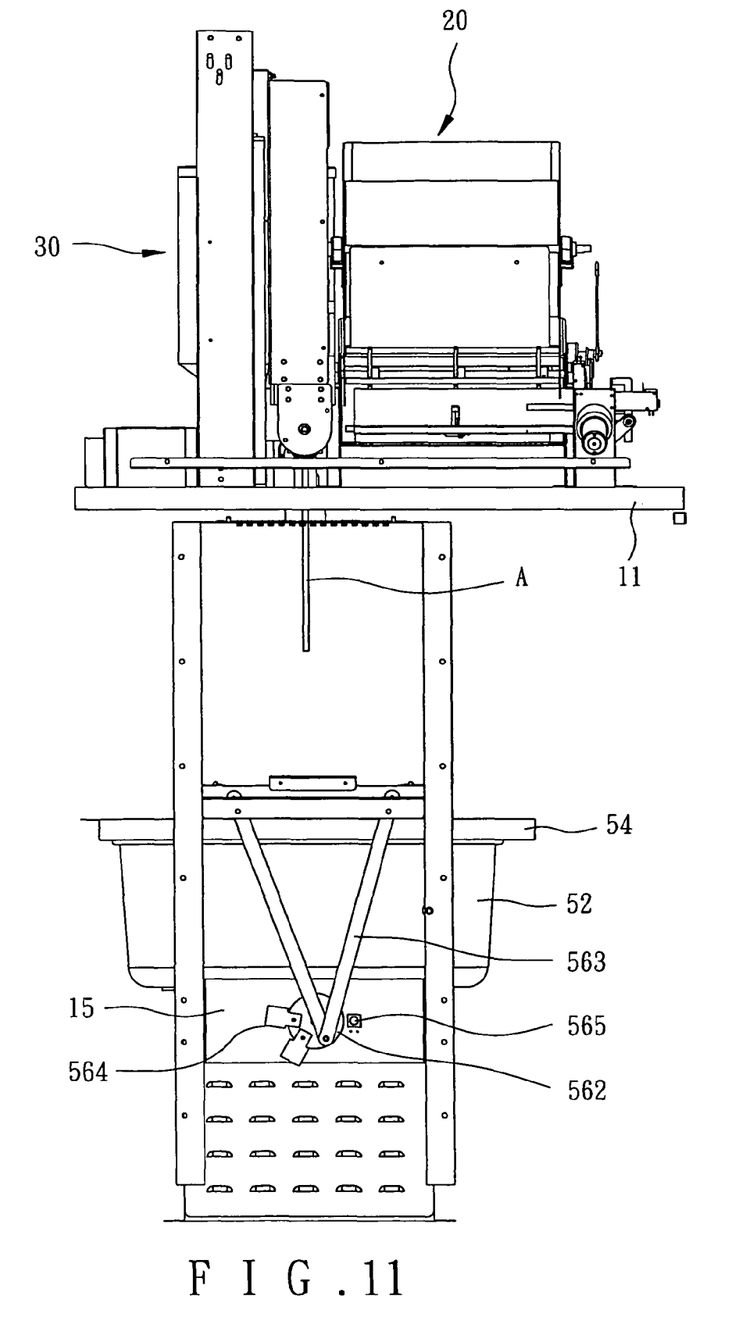
FIGS. 11 to 14 are front operational plan views of the sugar floss maker of the cotton candy machine in accordance with the present invention.
Figure 12:
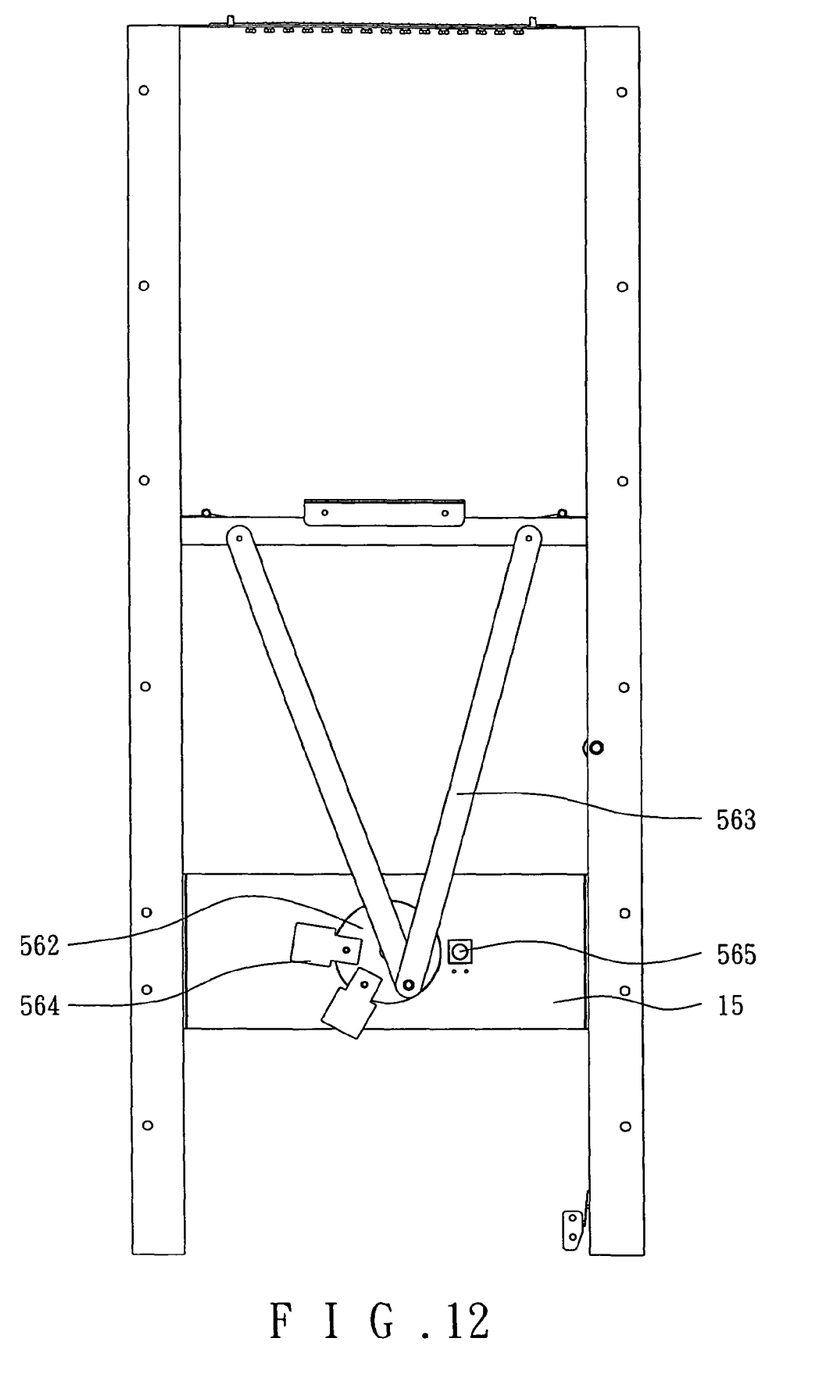
Figure 13:
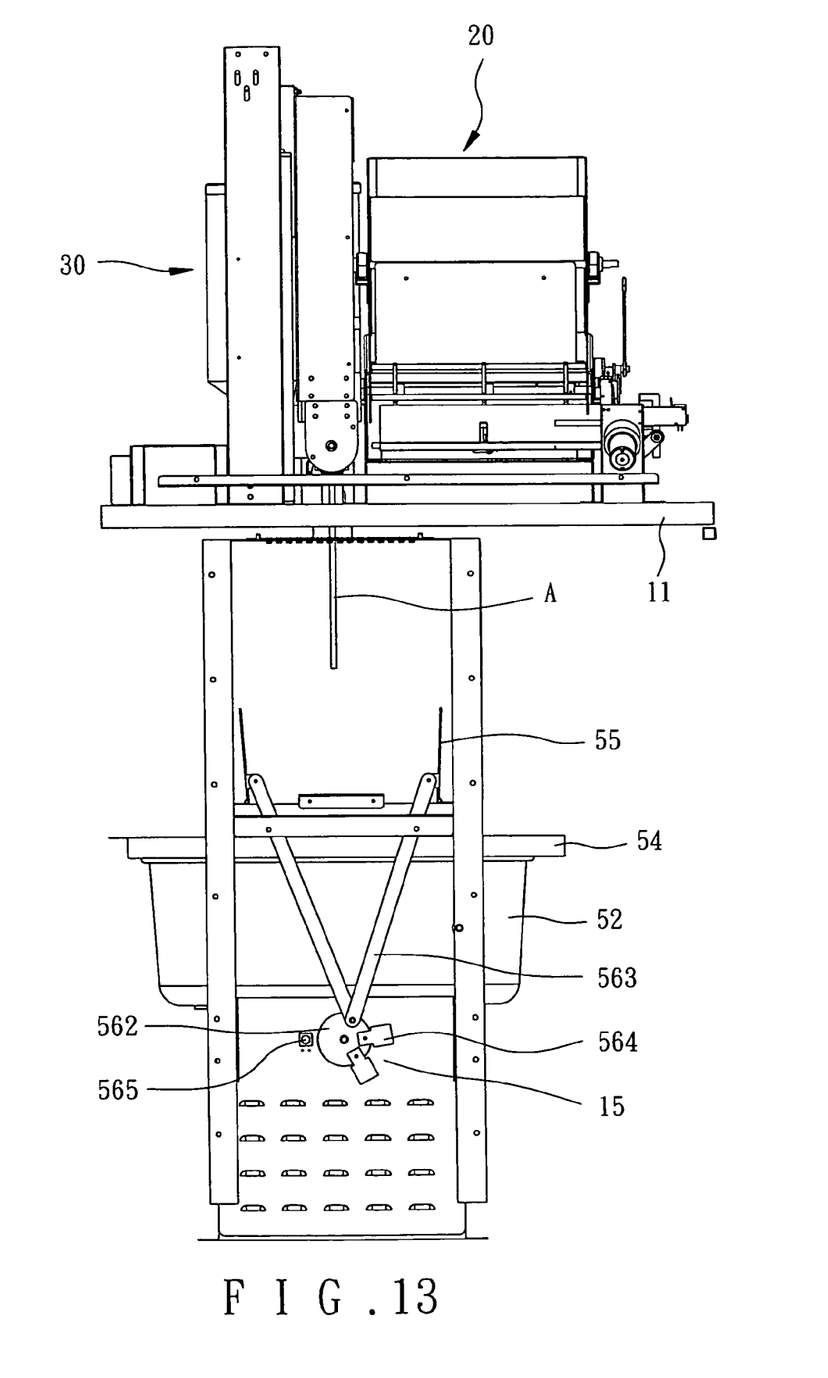
Figure 14:
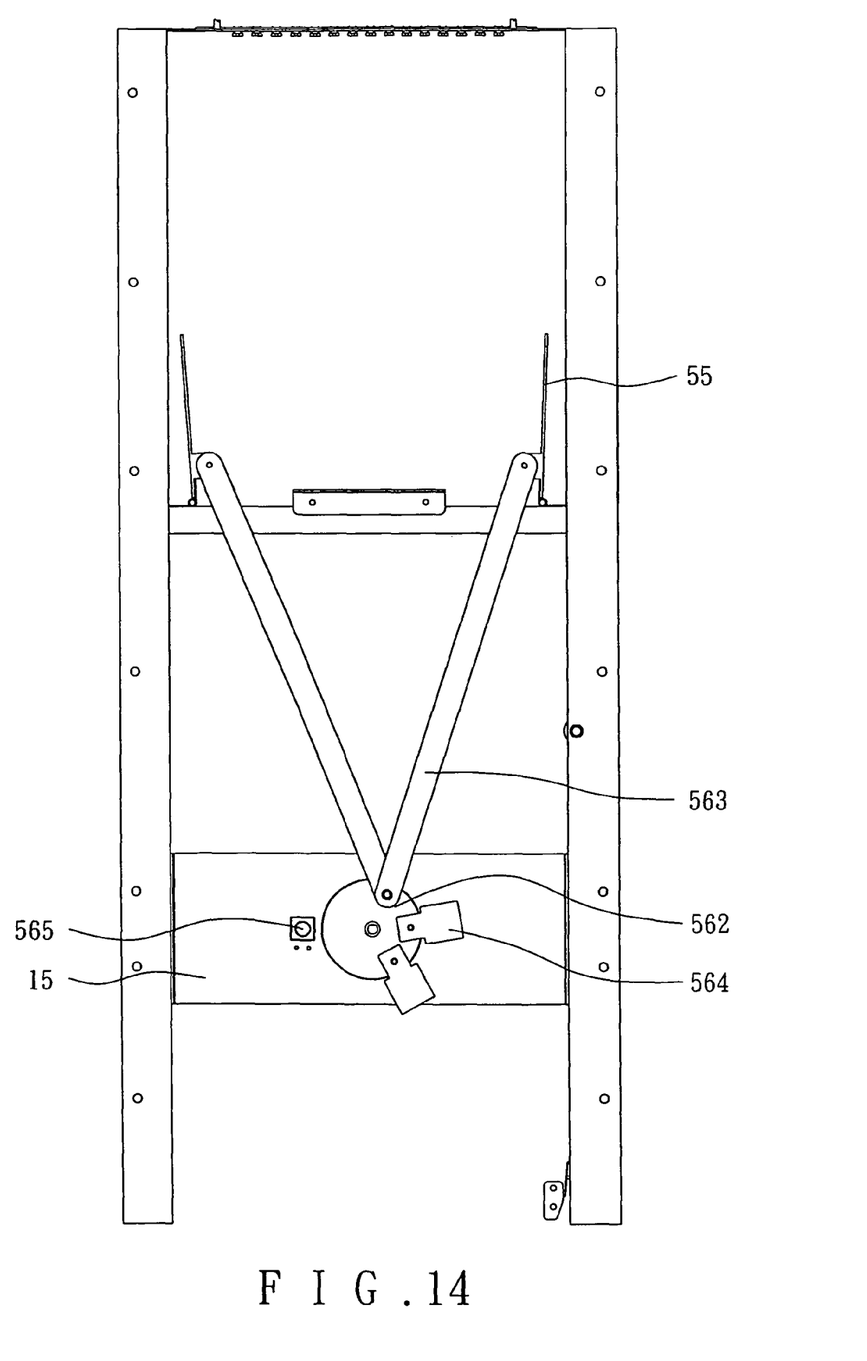

With reference to FIGS. 2 and 10, the feeding device (40) is mounted on the platform (11) and includes a tube (41) connected thereto. The tube (41) has a free end extending through the through hole (541) in the cover (54) and co-axially corresponding to the spinner head (53) for feeding the sugar granules into the spinner head (53) in a changeless quantity such that the spinner head (53) forms sugar floss when the motor (51) of the sugar floss maker (50) is operated.

Although the invention has been explained in relation to its preferred embodiment, it is to be understood that many other possible modifications and variations can be made without departing from the spirit and scope of the invention as hereinafter claimed.

What is claimed is:

1. A cotton candy machine comprising:
    a housing having a platform horizontally mounted in a middle portion thereof and a lower seat secured on a bottom of the housing, a window defined in a panel of the housing and a shelter pivotally mounted to an edge of the window for selectively closing the window, the shelter made of transparent material for user to conveniently take the finished cotton candy through the window, a plate secured on the lower seat;
    a stick grabbing device mounted on the platform in the housing, the stick grabbing device including:
        a receiving unit secured on the platform for containing sticks;
        an outputting device transversely mounted to a front portion of the receiving unit for taking the sticks away from the receiving unit one by one;
        a drive device laterally mounted to the receiving unit for driving the outputting device; and
        a push device mounted on the platform and aside corresponding to the outputting device for horizontally and longitudinally pushing the stick that is outputted from the outputting device;
    a stick rotating device mounted on the platform for downward moving and rotating the stick, and including:
        an elevator vertically mounted on the platform and reciprocally moved relative to the platform wherein the elevator includes a casing mounted on the platform, two parallel pillars received in the casing and vertically mounted on the platform, and a slider slidably mounted onto the two pillars, the slider situated on an upper portion of the two pillars when the stick rotating device have been operated, the elevator having a motor mounted thereon for operating the slider;
        a control device mounted on the elevator wherein the control device includes a frame and a connector respectively secured on a slider of the elevator and the control device includes a first control unit and a second control unit respectively mounted on the connector and the frame; and
        a holding device connected to the control device for temporarily holding the stick from the stick grabbing device and rotating the stick when the stick is vertical relative to the platform wherein the holding device includes a stable seat mounted to the frame of the control device and tow guide pillars vertically extending from a top of the stable seat, a slider plate slidably mounted on the two guide pillars and connected to the first control unit such that slider plate is reciprocally moved relative to the stable seat when the first control unit is operated, a wiggler pivotally mounted on the frame and connected to the second control unit such that the wiggler is wiggled when the second control unit is operated while each wiggle range of the wiggler being 90 degrees and the wiggler being horizontal after being operates, and a holder rotatably received in the wiggler for temporarily holding the stick and driven to rotate the stick when the stick is vertically inserted into the sugar floss maker;
    a sugar floss maker mounted on the lower seat and eccentrically corresponding to the stick rotating device, the sugar floss maker including a motor longitudinally mounted on the lower seat and a bowl co-axially mounted on the top of the motor of the sugar floss maker, a spinner head centrally mounted on a bottom of the bowl and driven by the motor of the sugar floss maker; and
    a feeding device mounted on the platform and including a tube connected thereto, the tube having a free end extending into the bowl and co-axially corresponding to the spinner head for feeding sugar granules into the spinner head in a changeless quantity such that the spinner head forms sugar floss when the motor of the sugar floss maker is operated.

2. The cotton candy maker as claimed in claim 1, wherein sugar floss maker includes a cover mounted on the top of the bowl for prevent the dust from entering the bowl.

3. The cotton candy machine as claimed in claim 2, wherein the cover includes an opening eccentrically defined therein for allowing the rotating stick inserted into the bowl due to the elevator of the stick rotating device.

4. The cotton candy machine as claimed in claim 3, wherein the sugar floss maker includes a pair of wiggle plates pivotally mounted in the casing for selectively closing the opening and a drive device mounted on the plate for controlling the pair of wiggle plates such that the pair of wiggle plates is lifted to open the opening before the rotating stick entering the bowl.

5. The cotton candy machine as claimed in claim 4, wherein drive device includes a motor laterally mounted to the plate and a roller co-axially mounted to a shaft of the motor of the drive device after the shaft of the motor of the drive device extending through the plate, two linkages pivotally and eccentrically connected to a distal side of the roller and a free end of each of the two linkages pivotally connected to a corresponding one of the pair of wiggle plates for controlling the pair of wiggle plates to allow the rotating stick inserted into the bowl and coil sugar floss from the spinner head when the motor of the drive device is operated.

6. The cotton candy machine as claimed in claim 5, wherein the drive device includes two tongues respectively radially secured on the roller thereof and two sensors respectively secured on the plate, the two tongues respectively and selectively covering a corresponding one of the two sensors for controlling the turn range of the roller of the drive device.

7. The cotton candy machine as claimed in claim 1, wherein the receiving unit includes:
    a casing having an upper opening and a bottom that is slant relative to the panel of the housing and has a transverse opening defined in a front portion of the bottom of the casing;
    a partition transversely secured in a middle portion of the casing, the partition having a lower edge that is separated from the bottom of the casing and the distance between the lower edge of the partition and the bottom of the casing provided to decide the number of the layers of the piled sticks after passing the partition;
    a stir plate downward pivotally in the casing and front relative to the partition, the stir plate making the sticks moved toward a front portion of the casing one after one.

8. The cotton candy machine as claimed in claim 7, wherein the outputting device includes:
- a roller set pivotally and transversely mounted to the front portion of the casing and parallel to the transverse opening, the roller set including multiple rollers mounted thereon, each roller of the roller set having multiple indentations radially defined in a periphery thereof and equally dividing the periphery of each of the rollers into several sections, a connecting line of corresponding indentations of each of the rollers parallel to an axis of the roller set; and
- a slide plate pivotally mounted on the platform by supports, the slide plate including a rear edge inserted into the transverse opening and corresponding to the roller set, and a front edge having a stopper upwardly extending therefrom to prevent the stick from detaching from the slide plate.

9. The cotton candy machine as claimed in claim 8, wherein the slide plate includes a through hole defined therein the slide plate, and a sensor secured on a back of the slide plate and corresponding to the through hole for sensing the rolling stick that passes through the through hole.

10. The cotton candy machine as claimed in claim 8, wherein the drive device of the stick grabbing device is laterally mounted to the casing for driving the stir plate and the roller set such that the stir plate is reciprocally wiggled relative to the partition and the roller set is rotated from casing to the slide plate for grabbing the stick to the slide plate, the rotating angle of the roller set of each operation equal to an included angle of two radiuses of two adjacent indentations.

11. The cotton candy machine as claimed in claim 8, wherein the push device includes a motor mounted on the platform (11), a linkage set connected to the motor of the push device and a push set connected to the linkage set, thereby the push set is reciprocally moved relative to the slide plate, the push set driven by the motor thereof and horizontally pushing the stick, which is situated on the stopper, the slide plate downward wiggled by the push set and the stick being separated from the slide plate when the stick is pushed to and held by the stick rotating device.

* * * * *